(12) United States Patent
Chiang et al.

(10) Patent No.: US 8,349,480 B1
(45) Date of Patent: Jan. 8, 2013

(54) ELECTRONIC DEVICE WITH DETACHABLE BATTERY

(75) Inventors: Po-Ching Chiang, New Taipei (TW); Cheng-Hsiu Du, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/444,060

(22) Filed: Apr. 11, 2012

(30) Foreign Application Priority Data

Jul. 27, 2011 (TW) .................................. 100126686

(51) Int. Cl.
*H01M 2/10* (2006.01)
(52) U.S. Cl. ............. 429/100; 429/96; 429/97; 320/112
(58) Field of Classification Search ........................ None
See application file for complete search history.

(56) References Cited

U.S. PATENT DOCUMENTS

| | | | |
|---|---|---|---|
| 2010/0086839 A1* | 4/2010 | Wu et al. | 429/97 |
| 2010/0086840 A1* | 4/2010 | Shao | 429/97 |
| 2010/0330407 A1* | 12/2010 | Lee | 429/97 |
| 2011/0070473 A1* | 3/2011 | Chen et al. | 429/100 |

* cited by examiner

*Primary Examiner* — John S Maples
(74) *Attorney, Agent, or Firm* — Altis Law Group, Inc.

(57) ABSTRACT

An electronic device includes an enclosure, a retaining piece, and a battery. The enclosure defines a battery space. The retaining piece is located at a side of the enclosure. The retaining piece can move elastically along a first direction. The battery is laid in the battery space and adapted to move along a second direction which is perpendicular to the first direction. The retaining piece is adapted to move from a compressed state to an ejected state. The battery pressed the retaining piece in the compressed state. The battery is moved into the battery space along the second direction and is blocked by the retaining piece.

18 Claims, 6 Drawing Sheets

ELECTRONIC DEVICE WITH DETACHABLE BATTERY

BACKGROUND

1. Technical Field

The present disclosure relates to an electronic device with detachable battery.

2. Description of Related Art

A rechargeable battery may be used for providing electrical power to electronic devices, such as portable electronic devices. The rechargeable battery may be detachable and mounted to an enclosure of the electronic device through screws or resilient hooks. However, a manual operation may be necessary for mounting or detaching the battery from the electronic device. Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
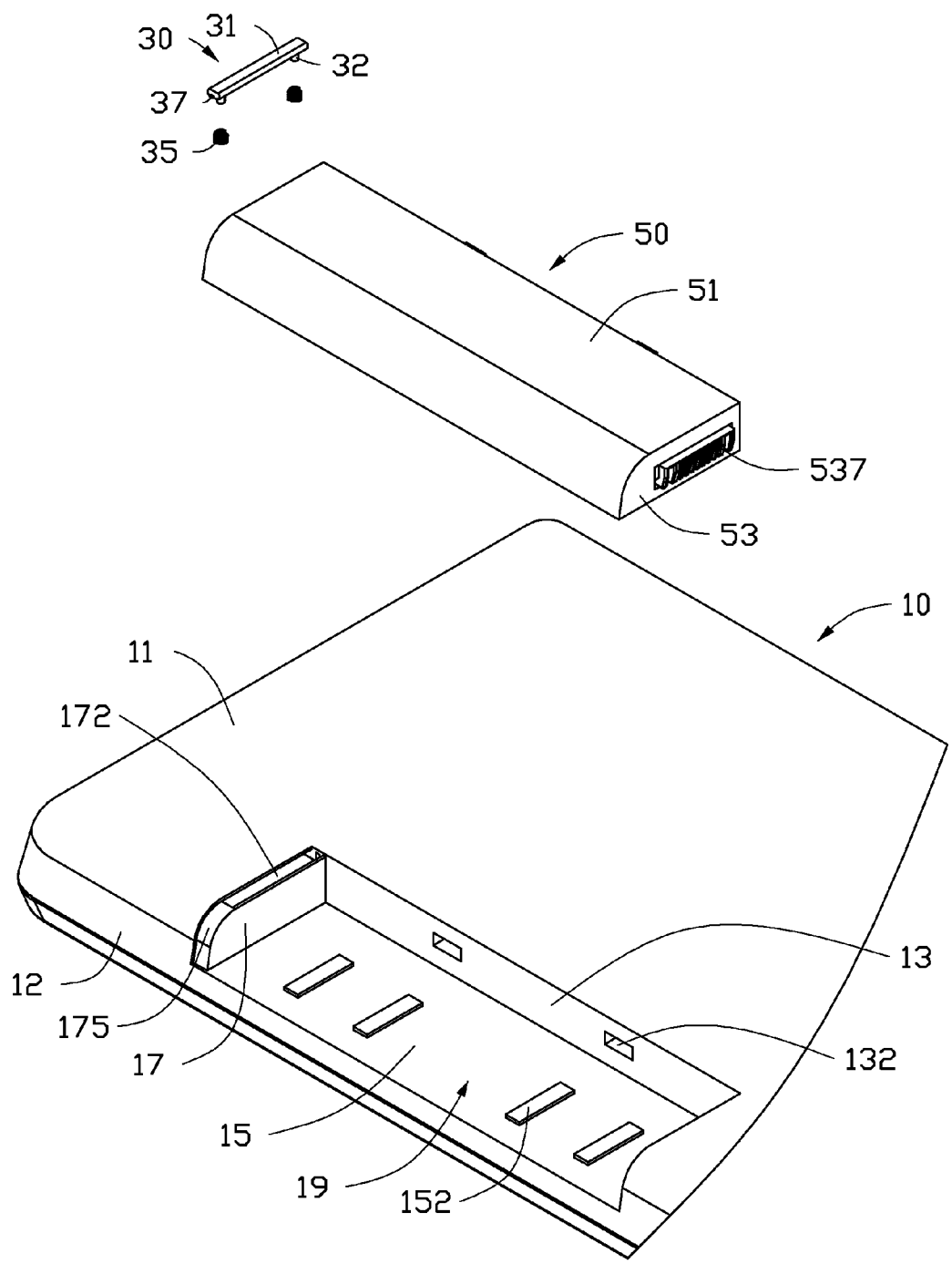
FIG. 1 is an exploded, isometric, partial view of an electronic device in one embodiment.

Referring to FIG. 1, in one embodiment, the electronic device includes an enclosure 10, a retaining piece 30 located on the enclosure 10, and a battery 50 for supplying power.

Figure 2:
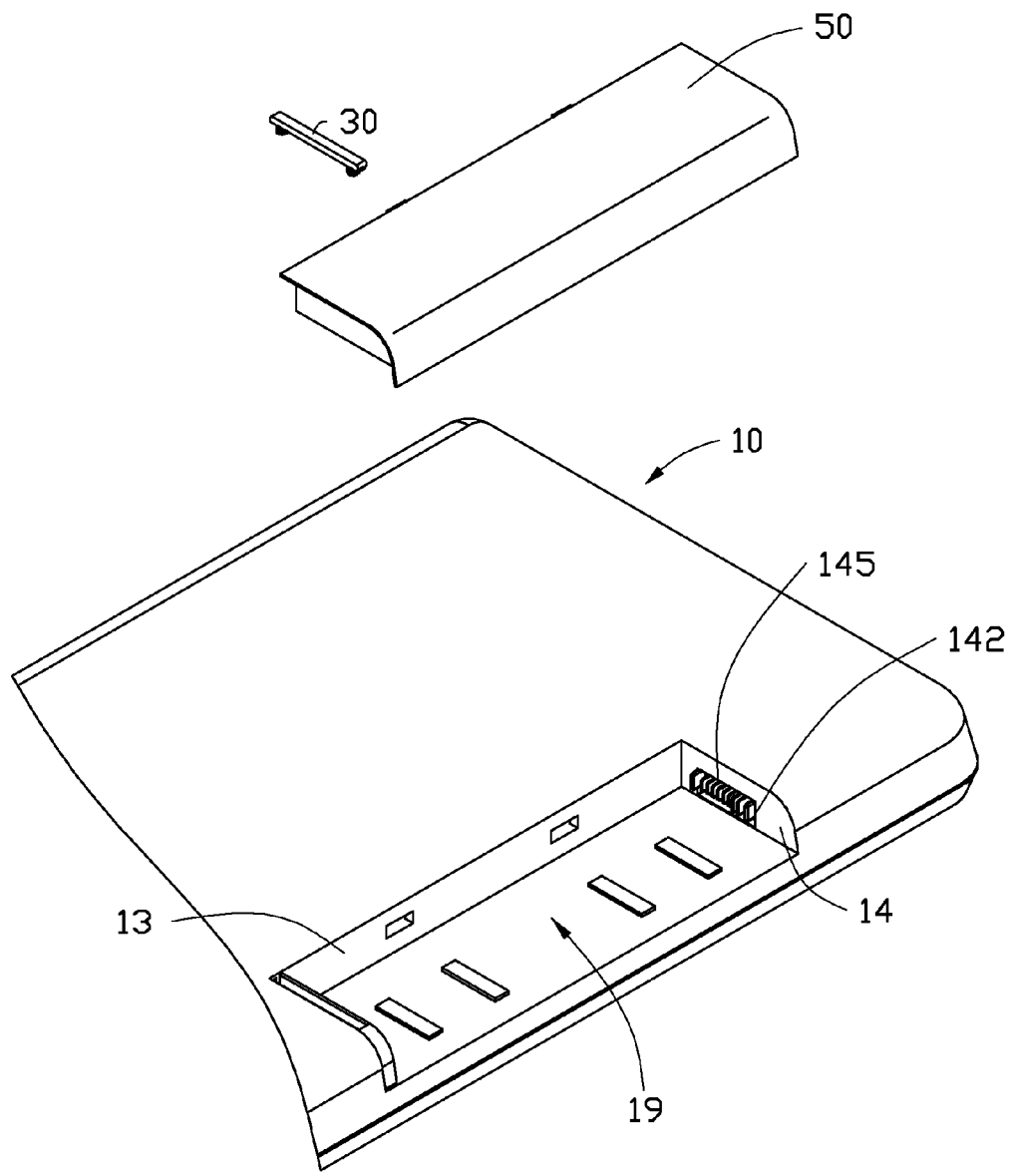
FIG. 2 is similar to FIG. 1, but from another aspect.
Figure 4:
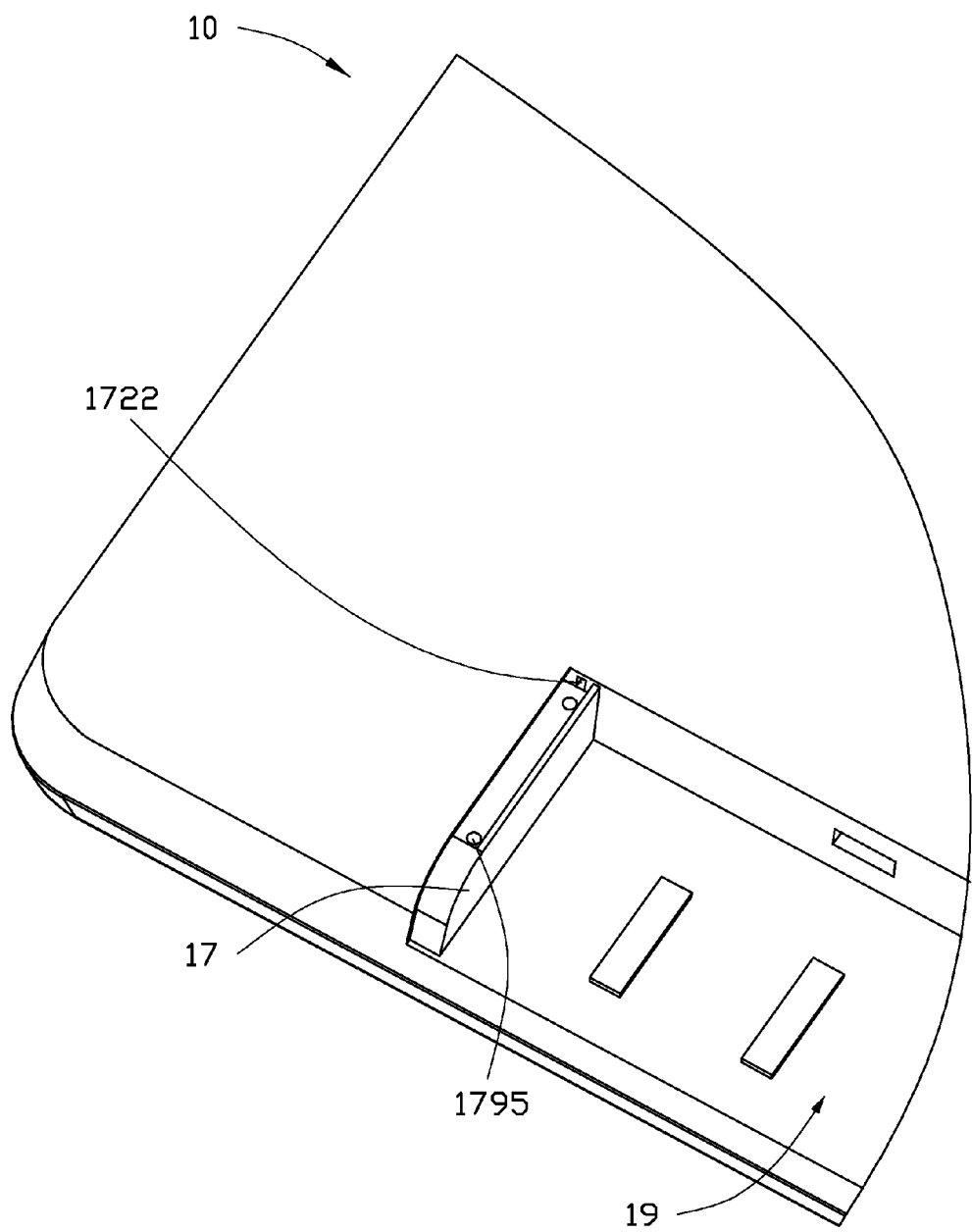
FIG. 4 is a partial view of an enclosure of the electronic device of one embodiment.

Referring to FIG. 2 and FIG. 4, the enclosure 10 includes a top surface 11 and a side surface 12. The top surface 11 connects to the side surface 12 along a curved surface. The enclosure 10 defines a battery space 19 for receiving the battery 50. The battery space 19 is defined at the top surface 11 and the side surface 12. The enclosure 10 includes a bottom wall 15, a rear wall 13, a first side wall 14, and a second side wall 17 of the battery space 19. The first side wall 14 is parallel to the second side wall 17. The first side wall 14 and the second side wall 17 are perpendicular to the rear wall 13. The bottom wall 15 includes a plurality of ridges 152. The plurality of ridges 152 extends along a direction substantially parallel to the first side wall 14. Each of the plurality of ridges 152 may have a rectangular shape. Two hook slots 132 (see FIG. 6) are defined in the rear wall 13. Each of the two hook slots 132 is L-shaped. An end of each of the two hook slots 132 extends toward the first side wall 14. A connector opening 142 is defined in the first side wall 14. A first connector 145 is located in the connector opening 142. The enclosure 10 includes a convex edge 175 opposite to the first side wall 14. The second side wall 17 is defined in the convex edge 175. The second side wall 17 defines a retaining slot 172 for receiving the retaining member 30. Two retaining holes 1722 (see FIG. 4) and two locking holes 1795 are defined in an inner wall of the retaining slot 172. A top surface of a convex edge 175 is lower than the top surface 11 and the side surface 12.

The retaining piece 30 includes an elongated main body 31, two posts 32 and two coil springs 35 surrounding the two posts 32. The main body 31 extends along a direction which is perpendicular to the rear wall 13. The main body 31 includes two tabs 37 for engaging with the two retaining holes 1722.

Figure 3:
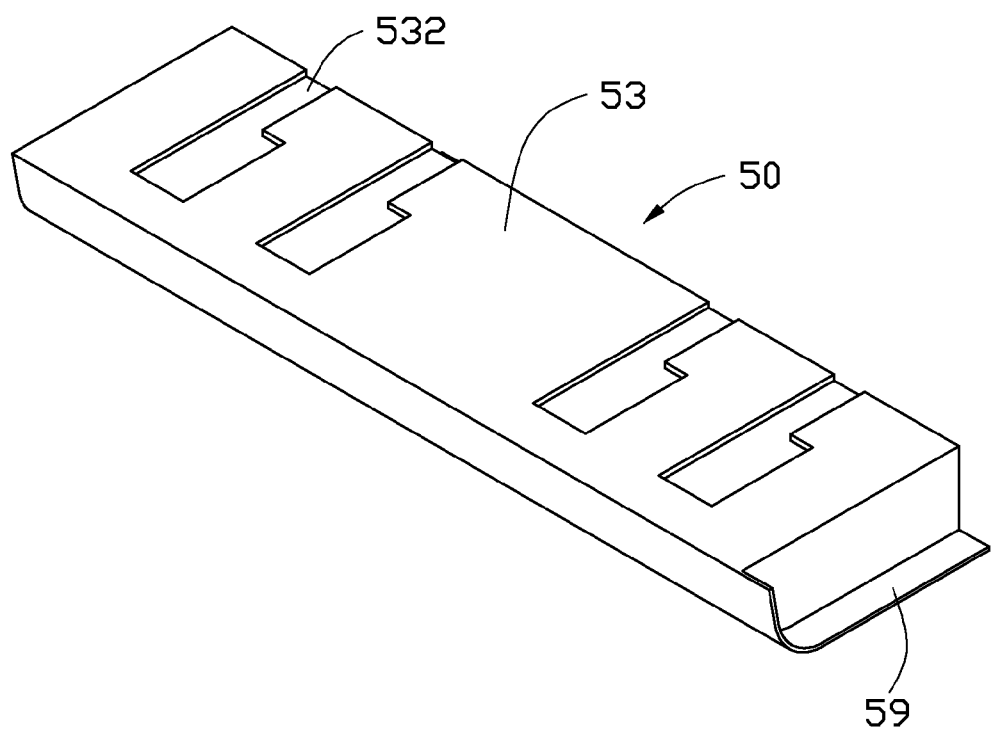
FIG. 3 is an isometric view of a battery of the electronic device in one embodiment.

Referring to FIG. 3, the battery 50 includes a battery body 53 and a top cover 51. The top cover 51 includes an extension flange 59 extending outside the battery 50. A width of the extension flange 59 substantially equals to a width of the convex edge 175. The battery body 53 defines a locking slot 532 corresponding to each of the plurality of ridges 152. Each of the locking slots 532 is substantially L-shaped. The battery body 53 includes a second connector 537 for engaging with the first connector 145. The battery body 53 includes two hooks 535 corresponding to the two hook slots 132.

Figure 5:
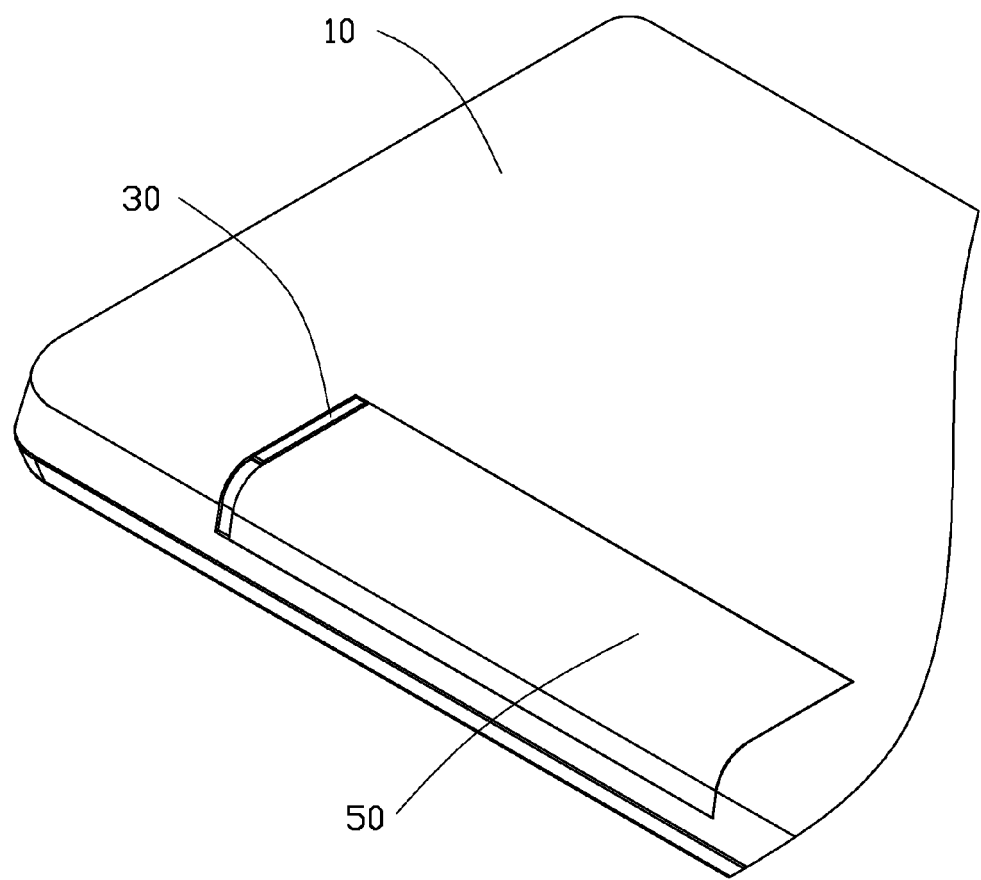
FIG. 5 is an assembled view of the electronic device of FIG. 1.
Figure 6:
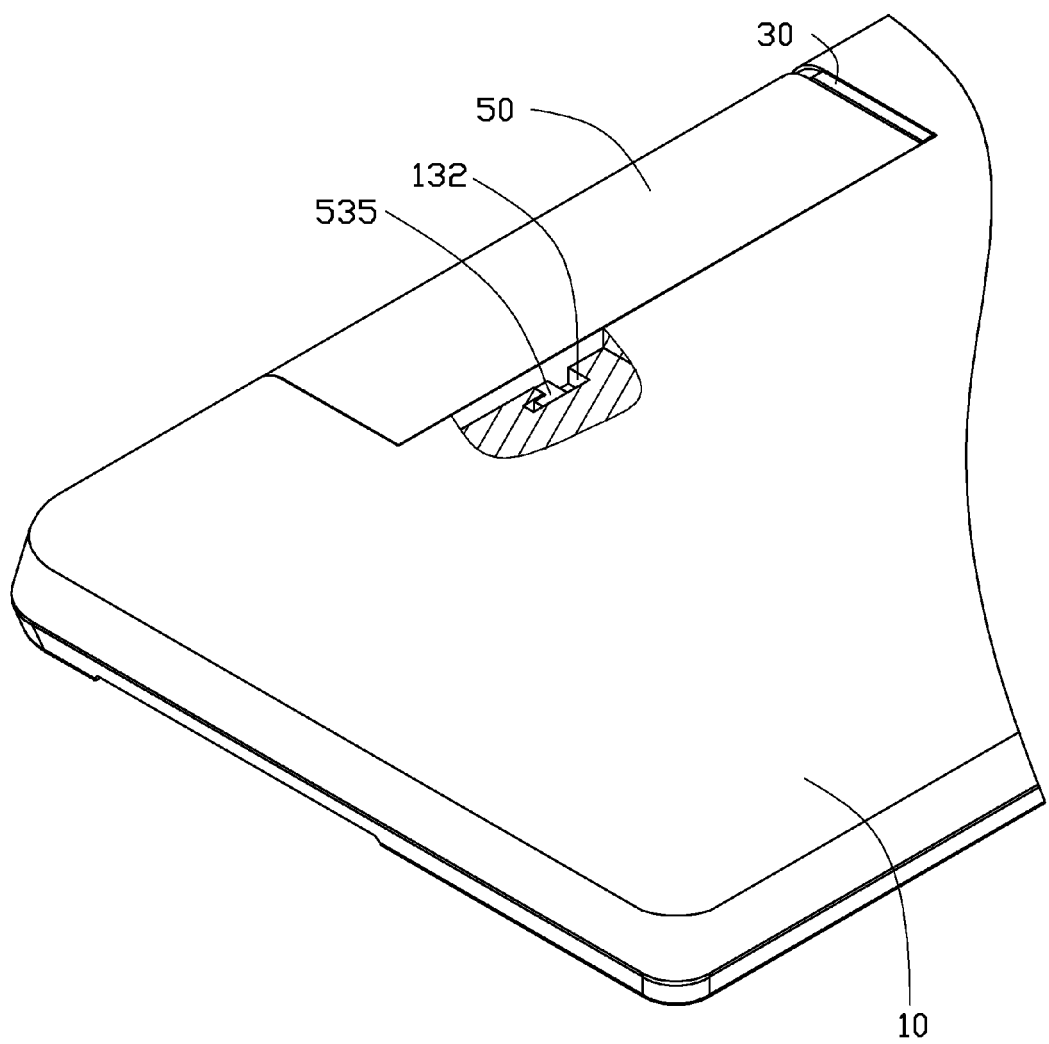
FIG. 6 is similar to FIG. 5, but from another aspect.

Referring to FIG. 5 and FIG. 6, in assembly, the retaining piece 30 is installed in the retaining slot 172. The two posts 32 are received in the two locking holes 1795. The two tabs 37 are restricted in the two retaining holes 1722. The retaining piece 30 can be resiliently deformed along a direction perpendicular to the retaining slot 172. The battery 50 is located in the battery space 19. The extension flange 59 presses the retaining piece 30. The deformation of the retaining piece 30 is downwards. The two hooks 535 extend into the two hook slots 132. The plurality of ridges 152 are received in the locking slot 532. The battery 50 is moved sideways towards the first connector 145. The second connector 537 couples with the first connector 145. An end of each of the two hooks 535 engages with each of the two hook slots 132. The plurality of ridges 152 engage with the locking slots 532. The retaining piece 30 moves from a compressed state, where the battery 50 is pressing down the retaining piece 30, to an ejected state, where the battery 50 is moved into the battery space 19 and is blocked by the retaining piece 30.

When the battery 50 must be removed from the enclosure 10, the retaining piece 30 is pressed. The battery 50 is moved sideways away from the first connector 145. Each of the two hooks 535 disengages from each of the two hook slots 132. The plurality of ridges 152 is disengaged from the locking slots 532. The battery 50 may be taken out of the enclosure 10.

It is also to be understood, however, that even though numerous characteristics and advantages have been set forth in the foregoing description of preferred embodiments, together with details of the structures and functions of the preferred embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. An electronic device comprising:
   an enclosure defining a battery space;
   a retaining piece located at a side of the enclosure, the retaining piece is adapted to be resiliently moved along a first direction;

a battery received in the battery space and is adapted to be moved along a second direction perpendicular to the first direction; and wherein the retaining piece is adapted to be moved from a compressed state to an ejected state, the battery presses down the retaining piece in the compressed state, and the battery is moved into the battery space along the second direction and the retaining piece blocks the battery in the battery space in the ejected state.

2. The electronic device of claim 1, wherein the enclosure comprises a top surface, and the retaining piece is not higher than the top surface in the ejected state.

3. The electronic device of claim 1, wherein the retaining piece comprises an elongated main body, a post and a coil spring surrounding on the post, the enclosure defines an elongated slot configured to receive the elongated main body, and the elongated main body extends along a third direction perpendicular to the first direction and second direction.

4. The electronic device of claim 1, wherein the battery comprises a top cover configured to cover the battery space.

5. The electronic device of claim 4, wherein the enclosure comprises a convex edge at a side of the battery space, the retaining piece is located on the convex edge; the battery comprises an extension flange, and a width of the extension flange is equal to a width of the convex edge.

6. The electronic device of claim 1, wherein the enclosure comprises a ridge in the battery space, the ridge extends along the third direction, and the battery defines an L-shaped locking slot configured to receive the ridge.

7. The electronic device of claim 1, wherein a hook is located on the battery and a hook slot is defined in the enclosure configured to engage with the hook.

8. The electronic device of claim 1, wherein the battery comprises a connector protruding out of the battery, and the enclosure comprises a connector opening in the battery space, the connector opening is configured to receive the connector.

9. The electronic device of claim 8, wherein the retaining piece and the connector opening are located at opposite sides of the battery when the battery is received in the battery space.

10. An electronic device comprising:
an enclosure defining a battery space, and the enclosure comprising a ridge in the battery space;
a retaining piece located at a side of the enclosure, the retaining piece being resiliently moveable along a first direction;
a battery received in the battery space, and the battery defining a locking slot configured to receive the ridge;
wherein the retaining piece is adapted to move from a compressed state to an ejected state, the battery presses down the retaining piece in the compressed state, and the battery is moved into the battery space along a second direction perpendicular to the first direction and the retaining piece blocks the battery in the battery space in the ejected state.

11. The electronic device of claim 10, wherein the enclosure comprises a top surface, the retaining piece is not higher than the top surface in the ejected state.

12. The electronic device of claim 10, wherein the retaining piece comprises elongated main body, a post and a coil spring surrounding on the post, the enclosure defines an elongated slot configured to receive the elongated main body, and the elongated main body extends along a third direction perpendicular to the first direction and the second direction.

13. The electronic device of claim 10, wherein the battery comprises top cover configured to cover the battery space.

14. The electronic device of claim 13, wherein the enclosure comprises a convex edge at a side of the battery space, the retaining piece is located on the convex edge; the battery comprises an extension flange, and a width of the extension flange is equal to a width of the convex edge.

15. The electronic device of claim 10, wherein the ridge extends along a third direction perpendicular to the first direction and the second direction, and the locking slot is L-shaped.

16. The electronic device of claim 10, wherein a hook is located on the battery, and a hook slot is defined in the enclosure configured to engage with the hook.

17. The electronic device of claim 10, wherein the battery comprises a connector protruding out of the battery, and the enclosure comprises a connector opening in the battery space, the connector opening is configured to receive the connector.

18. The electronic device of claim 17, wherein the retaining piece and the connector opening are located at opposite sides of the battery when the battery is received in the battery space.

* * * * *